(12) United States Patent
Cardillo

(10) Patent No.: US 10,325,026 B2
(45) Date of Patent: Jun. 18, 2019

(54) RECOMBINATION TECHNIQUES FOR NATURAL LANGUAGE GENERATION

(71) Applicant: INTERNATIONAL BUSINESS MACHINES CORPORATION, Armonk, NY (US)

(72) Inventor: Bryan D. Cardillo, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 14/866,066

(22) Filed: Sep. 25, 2015

(65) Prior Publication Data

US 2017/0091170 A1    Mar. 30, 2017

(51) Int. Cl.
*G06F 17/27* (2006.01)
*G06F 17/28* (2006.01)
*G06F 16/9032* (2019.01)

(52) U.S. Cl.
CPC .... *G06F 17/2795* (2013.01); *G06F 16/90332* (2019.01); *G06F 17/271* (2013.01); *G06F 17/2775* (2013.01); *G06F 17/2881* (2013.01)

(58) Field of Classification Search
CPC ...................................................... G06F 17/27
USPC ............................................................ 704/4
See application file for complete search history.

(56) References Cited

U.S. PATENT DOCUMENTS

| | | | | |
|---|---|---|---|---|
| 7,860,706 B2* | 12/2010 | Abir | ................... | G06F 17/2872 704/4 |
| 9,639,522 B2* | 5/2017 | Dogrultan | ............ | G06F 17/274 |
| 2003/0033288 A1* | 2/2003 | Shanahan | ........... | G06F 17/3064 |
| 2003/0069877 A1* | 4/2003 | Grefenstette | ..... | G06F 17/30643 |
| 2004/0117189 A1* | 6/2004 | Bennett | .................... | G06F 17/27 704/270.1 |
| 2004/0230637 A1* | 11/2004 | Lecoueche | .............. | G10L 15/20 709/200 |
| 2005/0203747 A1* | 9/2005 | Lecoeuche | ........ | G06F 17/30731 704/270.1 |
| 2005/0267751 A1* | 12/2005 | Bangalore | ........... | G06F 17/2881 704/242 |
| 2006/0235843 A1* | 10/2006 | Musgrove | ......... | G06F 17/30616 |
| 2008/0300878 A1* | 12/2008 | Bennett | .................... | G06F 17/27 704/251 |
| 2009/0182738 A1* | 7/2009 | Marchisio | ......... | G06F 17/30672 |
| 2013/0018649 A1 | 1/2013 | Deshmukh et al. | | |
| 2014/0379324 A1 | 12/2014 | Klapaftis et al. | | |
| 2016/0062981 A1* | 3/2016 | Dogrultan | ............... | G06F 17/24 704/9 |
| 2016/0301675 A1* | 10/2016 | Wiles | .................... | H04L 63/083 |

\* cited by examiner

*Primary Examiner* — Michael N Opsasnick
(74) *Attorney, Agent, or Firm* — Michael R. Long; Diana L. Roberts

(57) ABSTRACT

A technique for generating a new equivalent phrase for an input phrase includes receiving a first input phrase for natural language expansion. Tokens that correspond to parts of speech are generated for the first input phrase. An original grammar tree is generated using at least some of the tokens. One or more alternate grammar trees are generated that are different from the original grammar tree but substantially equivalent to the original grammar tree. One or more synonyms for at least one of the tokens are generated. Finally, one or more new phrases are generated based on the one or more alternate grammar trees and the one or more synonyms.

9 Claims, 8 Drawing Sheets

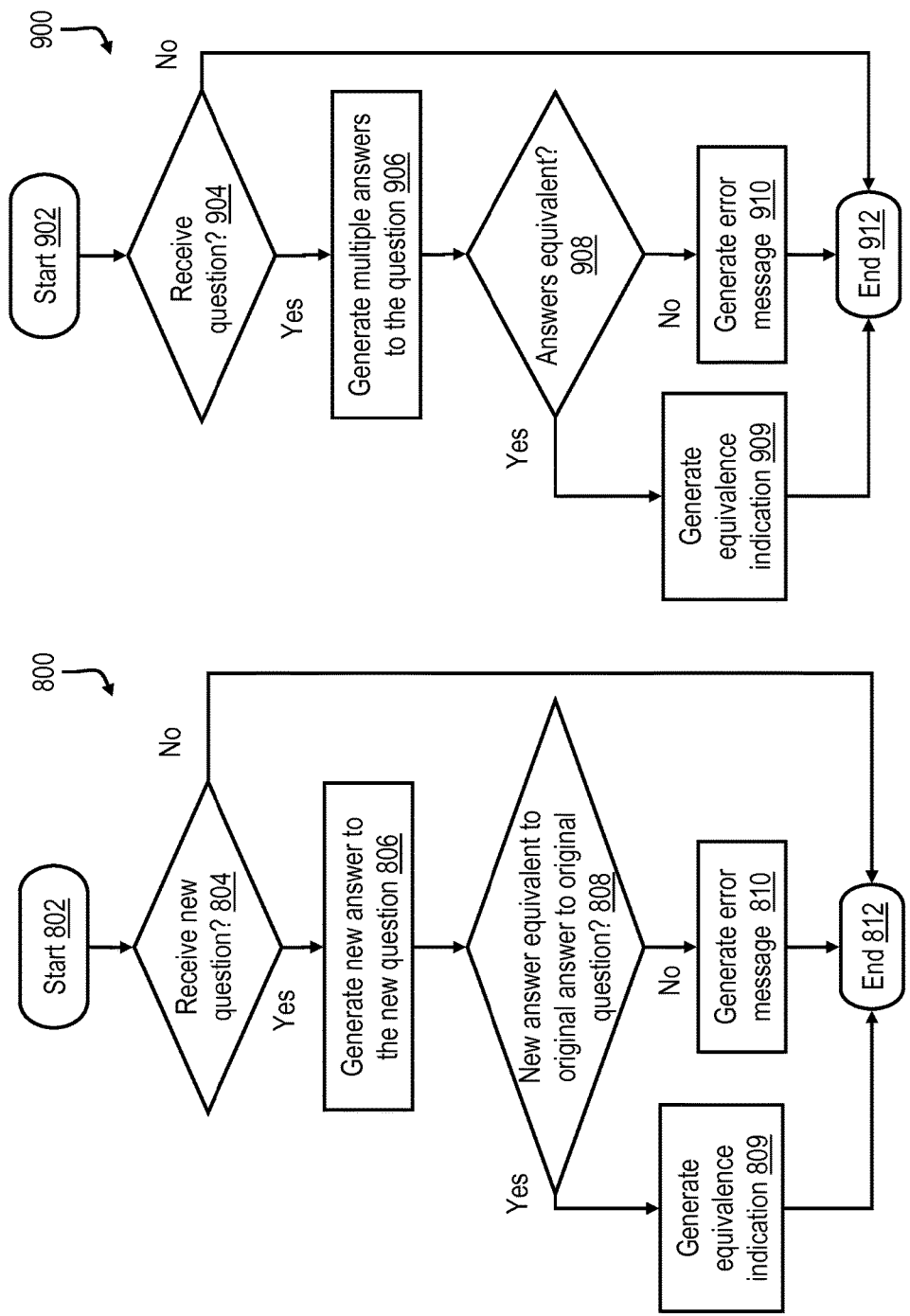

RECOMBINATION TECHNIQUES FOR NATURAL LANGUAGE GENERATION

BACKGROUND

The present disclosure is generally directed to techniques for natural language generation and, more particularly, to recombination techniques for natural language generation that facilitate test input generation for natural language processing systems.

Watson is a question answering (QA) system (i.e., a data processing system) that applies advanced natural language processing (NLP), information retrieval, knowledge representation, automated reasoning, and machine learning technologies to the field of open domain question answering. In general, conventional document search technology receives a keyword query and returns a list of documents, ranked in order of relevance to the query (often based on popularity and page ranking). In contrast, QA technology receives a question expressed in a natural language, seeks to understand the question in greater detail than document search technology, and returns a precise answer to the question.

The Watson system reportedly employs more than one-hundred different algorithms to analyze natural language, identify sources, find and generate hypotheses, find and score evidence, and merge and rank hypotheses. The Watson system implements DeepQA™ software and the Apache™ unstructured information management architecture (UIMA) framework. Software for the Watson system is written in various languages, including Java, C++, and Prolog, and runs on the SUSE™ Linux Enterprise Server 11 operating system using the Apache Hadoop™ framework to provide distributed computing. As is known, Apache Hadoop is an open-source software framework for storage and large-scale processing of datasets on clusters of commodity hardware.

The Watson system employs DeepQA software to generate hypotheses, gather evidence (data), and analyze the gathered data. The Watson system is workload optimized and integrates massively parallel POWER7® processors. The Watson system includes a cluster of ninety IBM Power 750 servers, each of which includes a 3.5 GHz POWER7 eight core processor, with four threads per core. In total, the Watson system has 2,880 POWER7 processor cores and has 16 terabytes of random access memory (RAM). Reportedly, the Watson system can process 500 gigabytes, the equivalent of one million books, per second. Sources of information for the Watson system include encyclopedias, dictionaries, thesauri, newswire articles, and literary works. The Watson system also uses databases, taxonomies, and ontologies.

Cognitive systems learn and interact naturally with people to extend what either a human or a machine could do on their own. Cognitive systems help human experts make better decisions by penetrating the complexity of 'Big Data'. Cognitive systems build knowledge and learn a domain (i.e., language and terminology, processes and preferred methods of interacting) over time. Unlike conventional expert systems, which have required rules to be hard coded into an expert system by a human expert, cognitive systems can process natural language and unstructured data and learn by experience, similar to how humans learn. While cognitive systems have deep domain expertise, instead of replacing human experts, cognitive systems act as a decision support system to help human experts make better decisions based on the best available data in various areas (e.g., healthcare, finance, or customer service).

U.S. Pat. No. 8,543,381 discloses replacing words in a language phrase with synonyms to generate new language phrases. U.S. Pat. No. 7,496,621 discloses replacing text in a phrase based on semantic features to generate new language phrases. U.S. Patent Application Publication No. 2002/0026306 discloses a method for choosing a tree adjoining grammar (TAG) based on a reference grammar and a predictive model with the goal of choosing a best TAG to generate a sentence. A paper entitled "An Overview of SURGE: a Reusable Comprehensive Syntactic Realization Component" describes a general purpose natural language generation approach that requires a nearly complete description of a target language to be useful. SimpleNLG™ employs a natural language generation approach that requires a relatively complete grammar description for a target language. A paper entitled "Asking what no one has asked before: using phrase similarities to generate synthetic web search queries" discloses generating data related to search queries. In general, Surge and SimpleNLG are implementations of language realization systems that are powerful, but require significant investment in configuring or programming before the systems can be used to generate language.

TAGs are formal grammars, similar to context free grammars, that are used to describe natural languages. A paper entitled "Integrated Natural Language Generation with Schema-Tree Adjoining Grammars," describes a complete system for natural language generation using TAGs as a formal grammar that is used to define a target natural language grammar. While using TAGs (as opposed to other formal or ad-hoc languages) to describe rules of a target natural language does yield benefits due to their generative properties, systems that employ TAGs have still required a rather complete definition of the language before the systems can be used to generate sentences for the language. Acrolinx™ is a product whose primary focus is improving writing quality. Acrolinx includes tools for generating language in the context of suggested text replacements to improve readability or better convey a particular message.

BRIEF SUMMARY

Disclosed are a method, a data processing system, and a computer program product (embodied in a computer-readable storage device) for natural language generation that facilitates expansion of test input for natural language processing systems, as well as expansion of answers provided by natural language processing systems.

A technique for generating a new equivalent phrase for an input phrase includes receiving a first input phrase for natural language expansion. Tokens that correspond to parts of speech are generated for the first input phrase. An original grammar tree is generated using at least some of the tokens. One or more alternate grammar trees are generated that are different from the original grammar tree but substantially equivalent to the original grammar tree. One or more synonyms for at least one of the tokens is generated. Finally, one or more new phrases are generated based on the one or more alternate grammar trees and the one or more synonyms.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIG. 8 is a flowchart of an exemplary process that is configured to determine whether a new question (generated in response to input of an original question) results in a new answer that is equivalent to an original answer (generated in response to the original question); and FIG. 9 is a flowchart of an exemplary process that is configured to determine whether multiple answers generated in response to a question are substantially similar (equivalent).

DETAILED DESCRIPTION

Figure 1:
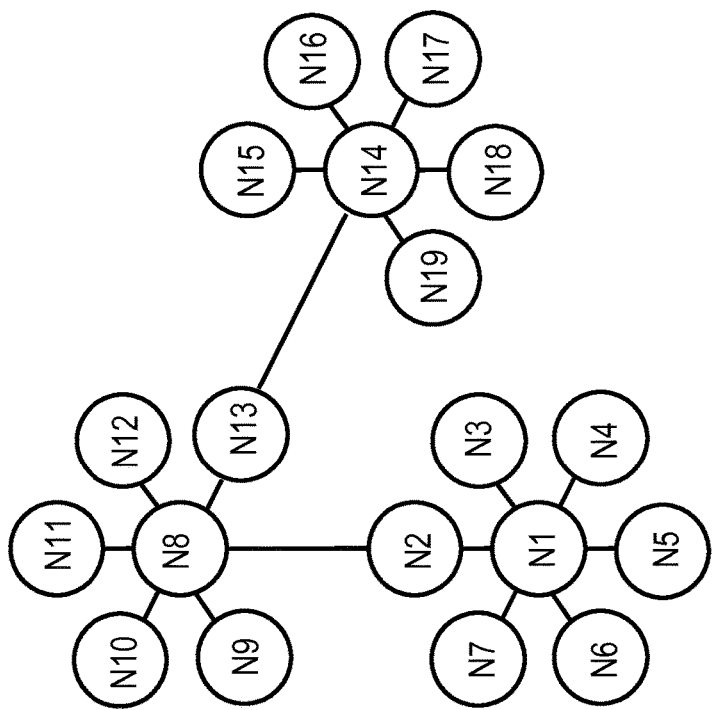
FIG. 1 is a diagram of an exemplary high performance computing (HPC) cluster that includes a number of nodes, with one or more of the nodes including multiple processors that are configured to function as a question answering (QA) system, according to various aspects of the present disclosure.

The illustrative embodiments provide a method, a data processing system, and a computer program product (embodied in a computer-readable storage device) for natural language generation that facilitates expansion of test input for natural language processing systems, as well as expansion of answers provided by natural language processing systems.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices. As used herein, the terms 'data' and 'evidence' are interchangeable.

As previously mentioned, U.S. Pat. No. 8,543,381 (hereinafter "the '381 patent") discloses the use of synonyms in natural language generation. However, the '381 patent does not address the generation of grammar trees that are utilized to modify input sentences and generate new language phrases. As mentioned above, Surge and SimpleNLG language realization systems require significant investment in configuring or programming before the systems can be used to generate language. U.S. Pat. No. 7,496,621 (hereinafter "the '621 patent") focuses on replacing text based on semantic features. However, the '621 patent does not address the use of grammar trees in language generation.

Tree adjoining grammars (TAGs) are formal grammars that are used to describe natural languages. TAGs are complementary to the disclosed techniques as they provide one formal grammar for describing the process of constructing a grammar tree. The disclosed techniques may be distinguished from TAGs because while the disclosed techniques use concepts defined by TAGs, TAGs do not inherently describe ways to generate language. U.S. Patent Application Publication No. U.S. 2002/0026306 (hereinafter "the '306 publication") discloses a method for choosing one form from a TAG based on a reference grammar and a predictive model with the goal of choosing the best TAG to generate a sentence. The '306 publication method requires a complete grammar to be specified by a TAG and reference grammar and requires training of a probabilistic model. In contrast, the disclosed techniques apply transforms directly to a grammar tree constructed from an input phrase with no prior grammar definition or training required.

According to the present disclosure, an input phrase (e.g., sentence) may be transformed with synonyms and one or more grammatically equivalent grammar trees to generate multiple equivalent output phrases. The newly generated output phrases can then be used to add variation to general computer dialog (e.g., in providing different but substantially similar answers to different but substantially similar questions) or to generate input test cases (test inputs) that incorporate synonyms and alternate phrasings to ensure that, for example, a QA system provides a substantially similar answer to substantially similar questions.

As one example, a user of a QA system may provide a first input question to the QA system that reads as follows:

"What does the adage live and let live mean?"

According to the present disclosure, a grammatically equivalent grammar tree may be used to generate multiple exemplary equivalent output phrases as follows:

"What is the meaning of the adage live and let live?"
"What is the meaning of the saying live and let live?"
"What is the meaning of the platitude live and let live?"
"What is the meaning of the expression live and let live?"

In the example above, the word 'adage' in the first output phrase has been replaced by: the synonym 'saying' in the second output phrase; the synonym 'platitude' in the third output phrase; and the synonym 'expression' in the fourth output phrase. It should be appreciated that while synonyms for only one word in the above example are illustrated, according to the present disclosure one or more words may be replaced by one or more synonyms to generate multiple equivalent phrases.

Output phrases may then be fed back to an input of a QA system to test whether the QA system provides a substantially similar answer for each of the output phrases. As one example, the QA system may provide a first answer to a first question (i.e., the first output phrase) as follows:

'Live and let live' is an idiom that expresses the idea that all should be able to live their lives in the manner they want. A QA system may also be configured to provide natural language expansion in answering questions that are substantially similar. For example, a QA system may provide a second answer to the second question (i.e., the second output phrase) as follows:

The phrase 'live and let live' expresses the idea that all should be able to live their lives in the manner they want. By providing answers that are substantially similar but not identical, answers to questions should appear more natural (i.e., less robotic) to a user of a QA system.

In various disclosed embodiments, content received by a QA system is tokenized for natural language expansion. Parts of speech are then determined for the content and the parts of speech are then mapped to an original grammar tree. One or more alternate grammar trees (that are grammatically equivalent to the original grammar tree and each other) are then created and one or more synonyms for one or more of the tokens are then determined. Using the alternate grammar trees and the synonyms equivalent content is then generated. As previously mentioned, the equivalent content may then be used as test input for a QA system or used to provide equivalent answers to similar questions input to a QA system by a user.

Conventionally, the Watson system has explored large amounts of structured and unstructured data to find candidate answers for a question (or a problem). According to various aspects of the present disclosure, techniques for performing high performance computing (HPC), or network computing, are described herein that facilitate expansion of test input for natural language processing systems, as well as expansion of answers provided by natural language processing systems. With reference to FIG. 1, an example topology for a relevant portion of an exemplary HPC cluster (supercomputer) 100 includes a number of nodes (N1-N18) that are connected in, for example, a three-dimensional (3D) Torus topology. Each of the nodes (N1-N18) may include one or more symmetric multiprocessors (SMPs). While eighteen nodes are illustrated in FIG. 1, it should be appreciated that more or less than eighteen nodes may be present in an HPC cluster configured according to the present disclosure.

Figure 2:
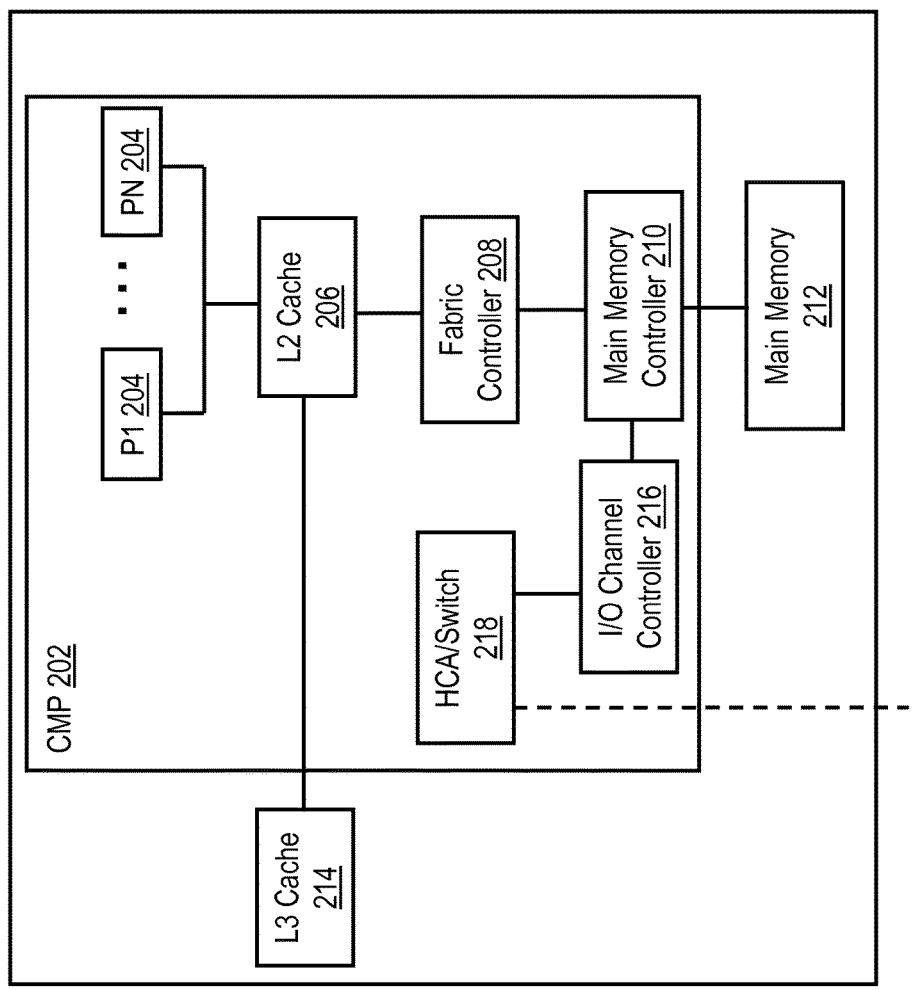
FIG. 2 is a diagram of a relevant portion of an exemplary symmetric multiprocessor (SMP) data processing system included in one of the nodes of FIG. 1, according to an embodiment of the present disclosure.

With reference to FIG. 2, each of the nodes N1-N18 of FIG. 1 may include a processor system, such as data processing system 200. As is illustrated, data processing system 200 includes one or more chip-level multiprocessors (CMPs) 202 (only one of which is illustrated in FIG. 2), each of which includes multiple (e.g., eight) processors 204. Processors 204 may, for example, operate in a simultaneous multithreading (SMT) mode or a single thread (ST) mode. When processors 204 operate in the SMT mode, processors 204 may employ multiple separate instruction fetch address registers to store program counters for multiple threads.

In at least one embodiment, processors 204 each include a first level (L1) cache (not separately shown in FIG. 2) that is coupled to a shared second level (L2) cache 206, which is in turn coupled to a shared third level (L3) cache 214. The L1, L2, and L3 caches may be combined instruction and data caches or correspond to separate instruction and data caches. In the illustrated embodiment, L2 cache 206 is further coupled to a fabric controller 208 that is coupled to a main memory controller (e.g., included in a Northbridge) 210, which supports a main memory subsystem 212 that, in various embodiments, includes an application appropriate amount of volatile and non-volatile memory. In alternative embodiments, fabric controller 208 may be omitted and, in this case, L2 cache 206 may be directly connected to main memory controller 210.

Fabric controller 208, when implemented, facilitates communication between different CMPs and between processors 204 and memory subsystem 212 and, in this manner, functions as an interface. As is further shown in FIG. 2, main memory controller 210 is also coupled to an I/O channel controller (e.g., included in a Southbridge) 216, which is coupled to a host channel adapter (HCA)/switch block 218. HCA/switch block 218 includes an HCA and one or more switches that may be utilized to couple CMP 202 to CMPs in other nodes (e.g., I/O subsystem nodes and processor nodes) of HPC cluster 100.

Figure 3:
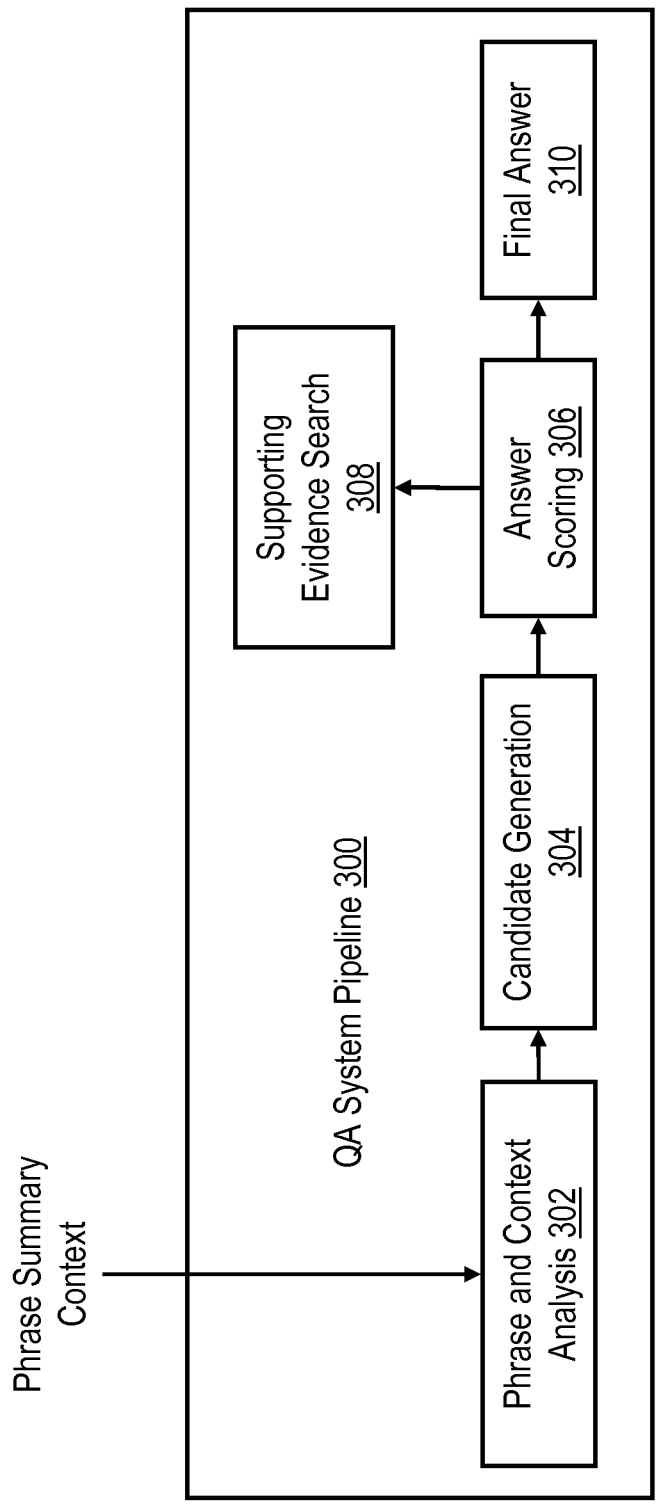
FIG. 3 depicts relevant components of an exemplary data processing system pipeline in the form of a modified question answering (QA) system pipeline.

FIG. 3 illustrates relevant components of a modified QA system pipeline for an exemplary modified QA system. As is illustrated in FIG. 3, a context analysis block 302 of modified QA system pipeline 300 receives phrase (question) summary contexts as inputs and generates outputs representing its analysis of the contexts. A candidate answer generation block 304 of modified QA system pipeline 300 receives the outputs from context analysis block 302 at an input and generates candidate answers. The candidate answers are provided to an input of a candidate answer scoring block 306, which is configured to initiate a supporting evidence search (by supporting evidence search block 308) in order to score the various candidate answers. The results of the scoring are provided to a final candidate answer block 310, which is configured to provide a final candidate answer based on the scoring of the candidate answers. It should be appreciated that blocks 302-310 may be implemented in program code executing on one or more processor cores or may be directly implemented in dedicated hardware (logic).

Figure 4:
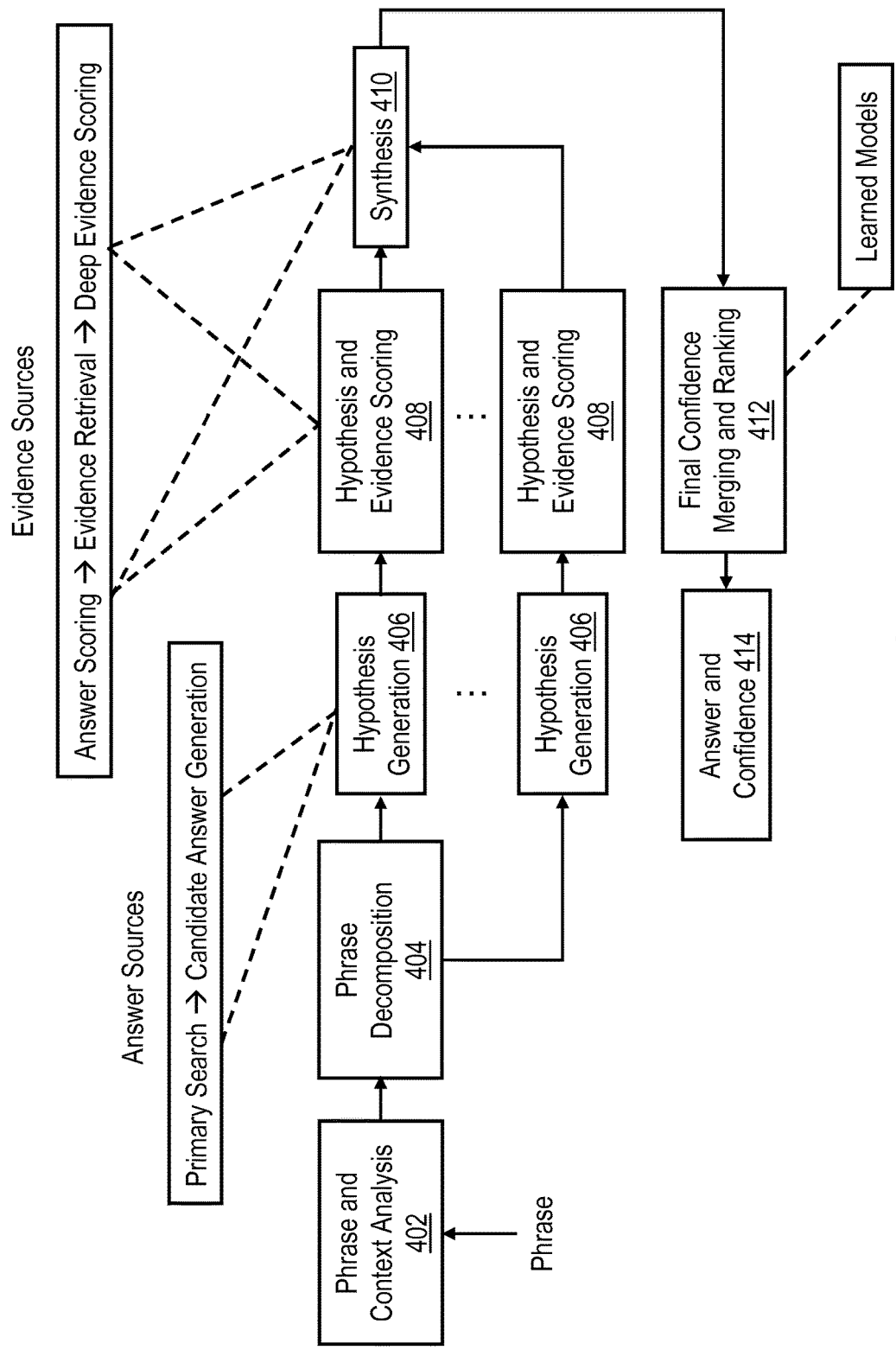
FIG. 4 depicts relevant components of the exemplary modified QA system pipeline of FIG. 3 in additional detail.

FIG. 4 illustrates relevant components of an exemplary modified QA system pipeline in additional detail. As is illustrated, phrase and context analysis block 402 receives a phrase (e.g., a question) in a natural language. An output of block 402 is provided to a phrase decomposition block 404, which further analyzes the different textual, grammatical, linguistic, punctuation and/or other components of the phrase. Block 404 provides inputs to multiple hypothesis generation blocks 406, which perform parallel hypothesis generation for candidate answers. Hypothesis generation blocks 406 each perform a primary search, collect reference data from different structured and unstructured sources, and generate candidate answers. For example, data generated by hypothesis 'i' may be referenced as 'D_i', and data generated by hypothesis 'j' may be referenced as 'D_j'. The data 'D_i' and 'D_j' may be the same data, completely different data, or may include overlapping data.

As one example, a modified QA system may be configured, according to the present disclosure, to: receive a question; create 'N' hypotheses (1 . . . N) to find candidate answers (e.g., N=10); and load data for each hypothesis 'i' on which to operate into a shared cache. For example, assuming a shared cache across all hypotheses, 1/Nth of the shared cache may be loaded with data for each hypothesis to operate on. The modified QA system may be further configured to execute the 'N' hypotheses to return 'M' candidate answers (in this case, each hypothesis generates one or more candidate answers). For example, the notation 'ANS_i' may be employed to denote a set of candidate answers generated by hypothesis 'i'. In various embodiments, hypothesis and evidence scoring for each hypothesis is initiated in hypothesis and evidence scoring blocks 408. That is, the modified QA system is further configured to score all the candidate answers using hypothesis and evidence scoring techniques (e.g., providing 'M' scores for 'M' candidate answers). In synthesis block 410 the modified QA system evaluates the candidate answers with the highest scores and determines which hypotheses generated the highest scores.

Following block 410, the modified QA system initiates final confidence merging and ranking in block 412. Finally, in block 414, the modified QA system provides a single answer (and may provide a confidence score) for the answer. Assuming, for example, the candidate answers 'j', 'k', and 'l' have the highest scores, a determination may then be made as to which of the hypotheses generated the best candidate answers. As one example, assume that hypotheses 'c' and 'd' generated the best candidate answers 'j', 'k', and 'l'. The modified QA system may then upload additional data required by hypotheses 'c' and 'd' into the cache and unload data used by other hypotheses from the cache. According to the present disclosure, the priority of what data is uploaded is relative to candidate answers scores (as such, hypotheses producing lower scores have less associated data in cache). When a new question is received, the above-described process is repeated. If the hypotheses 'c' and 'd' again produce best candidate answers, the modified QA system loads more data that is relevant to the hypotheses 'c' and 'd' into the cache and unloads other data.

If, on the other hand, hypotheses 'h' and 'g' produce the best candidate answers for the new question, the modified QA system loads more data relevant to the hypotheses 'h' and 'g' into the cache and unloads other data. It should be appreciated that, at this point, hypotheses 'c' and 'd' probably still have more data in the cache than other hypotheses, as more relevant data was previously loaded into the cache for the hypotheses 'c' and 'd'. According to the present disclosure, the overall process repeats in the above-described manner by basically maintaining data in the cache that scoring indicates is most useful. The disclosed process may be unique to a modified QA system when a cache controller is coupled directly to a scoring mechanism of the modified QA system.

Figure 5:
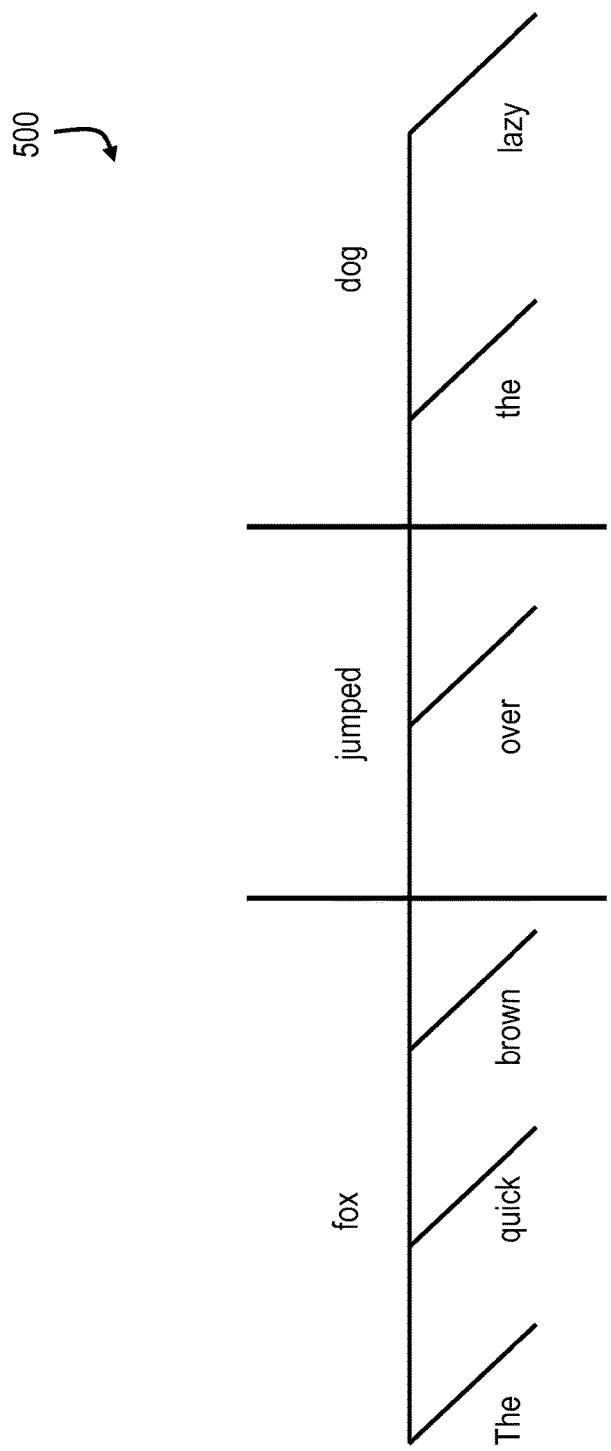
FIG. 5 depicts a sentence diagram for an exemplary input phrase (sentence) that is input to a QA system.
Figure 6:
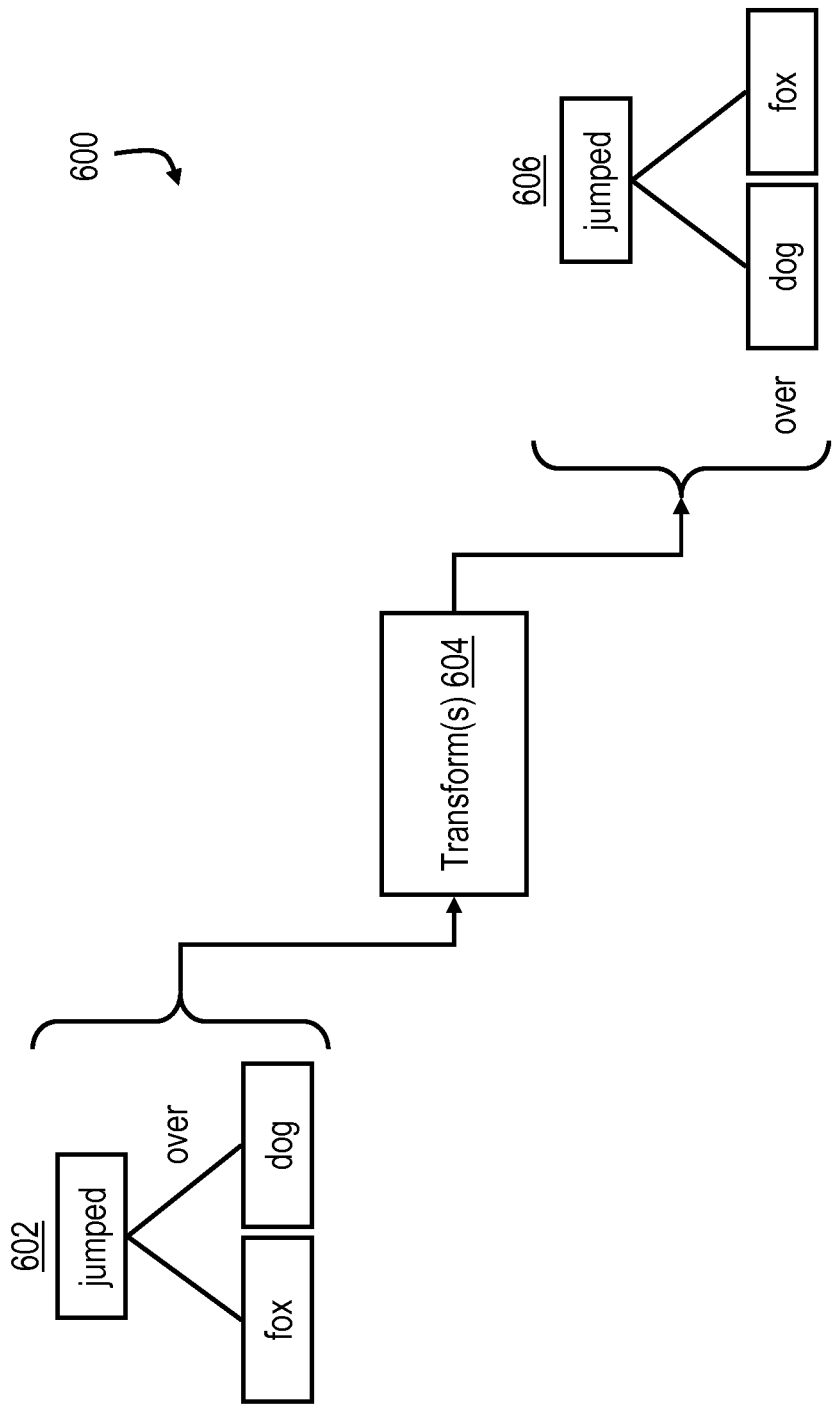
FIG. 6 depicts an exemplary generated grammar tree that is created by transforming an exemplary original grammar tree for the sentence diagramed in FIG. 5.

With reference to FIG. 5, an exemplary first input sentence (i.e., "The quick brown fox jumped over the lazy dog.") is illustrated as being tokenized in sentence diagram 500. With reference to FIG. 6, a simplified original grammar tree 602 is illustrated for the sentence diagrammed in sentence diagram 500 of FIG. 5. One or more graph transformation operations may then be performed (by transform(s) 604) to generate new sentences that are variations of the input sentence. As is illustrated, transforming simplified original grammar tree 602 using transform(s) 604 provides generated grammar tree 606, which may be utilized to generate equivalent output sentences. For example, for the first input sentence (i.e., "The quick brown fox jumped over the lazy dog."), a first equivalent output sentence (i.e., "Over the lazy dog jumped the quick brown fox") may be generated. As another example, for the first input sentence one or more second equivalent output sentences ("Over the lethargic dog jumped the quick brown fox."; "Over the lazy dog jumped the fast brown fox."; "Over the lethargic dog jumped the fast sorrel fox."; etc.) may be generated by replacing tokens (e.g., adjectives) in the first equivalent output sentence with synonyms.

Figure 7:
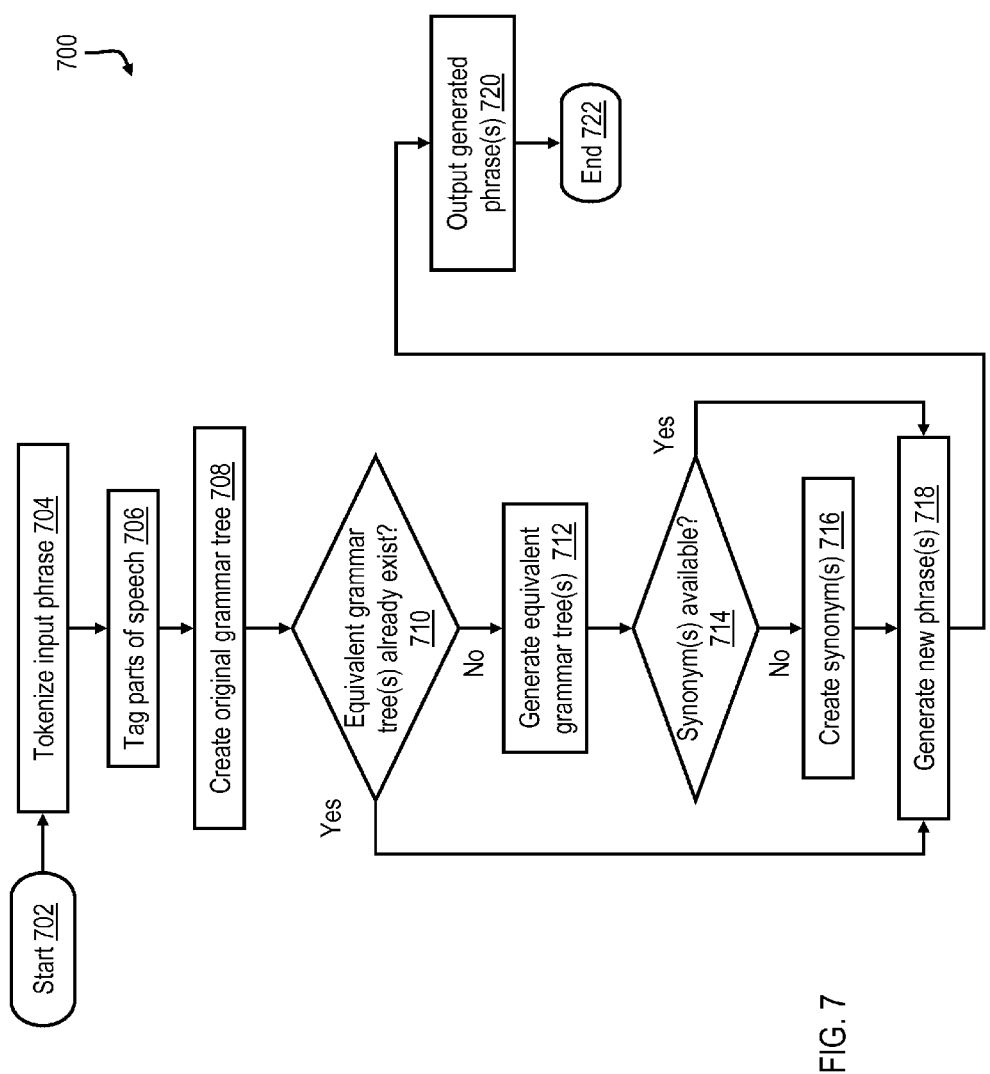
FIG. 7 is a flowchart of an exemplary process for generating one or more output phrases that may be utilized as test input for a QA system or in answer to a question received by the QA system, according to an embodiment of the present disclosure.

With reference to FIG. 7, a process 700 that is configured to generate one or more output phrases that may be utilized as test input for a QA system or as answers to a question received by the QA system, according to an embodiment of the present disclosure, is illustrated. Process 700 may be, for example, executed by one or more data processing systems 200 that implement a modified QA system, as discussed above. In block 702 process 700 is initiated, e.g., in response to a user providing an input phrase, by data processing system 200. Next, in block 704, data processing system 200 tokenizes the input phrase.

Then, in block 706, data processing system 200 tags parts of speech (e.g., labels a token as a noun, verb, adjective, pronoun, etc.) of the input phrase. Next, in block 708, data processing system 200 creates an original grammar tree for the input phrase using applicable tokens. Then, in decision block 710, data processing system 200 determines whether an appropriate number of equivalent grammar trees have already been generated for the original grammar tree and whether an appropriate number of synonyms for tokens in the input phrase have been established. In response to an appropriate number of equivalent grammar trees having already been generated and an appropriate number of synonyms having already been established, control transfers to block 718, where data processing system 200 generates an appropriate number of new phrases. Then, in block 720 data processing system 200 outputs the phrases that are generated based on the equivalent grammar trees and the established synonyms. From block 720 control transfers to block 722, where process 700 terminates.

In response to a determination at block 710 that an appropriate number of equivalent grammar trees have not already been generated and/or an appropriate number of synonyms have not already been established, control transfers from block 710 to block 712. In block 712, data processing system 200 generates an appropriate number of equivalent grammar trees. Next, in decision block 714, data processing system 200 determines whether an appropriate number of synonyms are available. In response to an appropriate number of synonyms not being available in block 714, control transfers to block 716, where data processing system 200 generates an appropriate number of synonyms. In response to an appropriate number of synonyms being available in block 714, control transfers to block 718, where data processing system 200 generates an appropriate number of new phrases.

With reference to FIG. 8, a process 800 is illustrated that is configured to determine whether a new question (generated in response to input of an original question) results in a new answer that is equivalent to an original answer (generated in response to the original question). Process 800 may be, for example, executed by one or more data processing systems 200 that implement a modified QA system, as discussed above. In block 802 process 800 is initiated, e.g., in response to input of a question, by data processing system 200. Next, in decision block 804, data processing system 200 determines whether the question is a new question that corresponds to an original question. For example, related questions may have a common tag. In response to the question not being a new question that corresponds to an original question, control transfers from block 804 to block 812, where process 800 terminates. In response to the question being a new question that corresponds to an original question control transfers from block 804 to block 806.

In block 806 data processing system 200 generates a new answer to the new question. Then, in decision block 808 data processing system 200 determines (e.g., using semantic analysis) whether the new answer is substantially similar (equivalent) to an original answer generated in response to the original question. In response to the new answer being equivalent to the original answer (generated in response to the original question), control transfers to block 809. In block 809 data processing system 200 generates an equivalence indication for the new and original questions. Following block 809 control transfers to block 812. In response to the new answer not being equivalent to the original answer (generated in response to the original question), control transfers to block 810. In block 810 data processing system 200 generates an error message that indicates the new and original questions did not result in equivalent answers. Following block 810 control transfers to block 812.

With reference to FIG. 9, a process 900 is illustrated that is configured to determine whether multiple answers generated in response to a question are substantially similar (equivalent). Process 900 may be, for example, executed by one or more data processing systems 200 that implement a modified QA system, as discussed above. In block 902 process 900 is initiated, e.g., in response to input of a phrase, by data processing system 200. Next, in decision block 904, data processing system 200 determines whether the phrase is a question. For example, a question may be indicated by punctuation (e.g., a question mark at the end of the phrase). In response to the phrase not being a question, control transfers from block 904 to block 912, where process 900 terminates. In response to the phrase being a question, control transfers from block 904 to block 906.

In block 906 data processing system 200 generates multiple answers to the question. Then, in decision block 908 data processing system 200 determines (e.g., using semantic analysis) whether the answers are substantially similar (equivalent). In response to the answers being equivalent control transfers to block 909. In block 909 data processing system 200 generates an equivalence indication for the answers. Following block 909 control transfers to block 912, where the illustrated process ends. In response to the answers not being equivalent in block 908, control transfers to block 910. In block 910 data processing system 200 generates an error message that indicates the generated answers are not equivalent answers. Following block 910, the process of FIG. 9 ends at block 912.

Accordingly, techniques have been disclosed herein that advantageously generate one or more output phrases that may be utilized as test input for a QA system or in answer to a question received by the QA system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of generating one or more new equivalent phrases for an input phrase, comprising:
    receiving, by a phrase generating system, a first input phrase for natural language expansion, wherein the first input phrase is a question;
    generating, by the phrase generating system, tokens that correspond to parts of speech for the first input phrase;
    generating, by the phrase generating system, an original grammar tree using at least some of the tokens;
    generating, by the phrase generating system, one or more alternate grammar trees that are different from the original grammar tree but equivalent to the original grammar tree;
    generating, by the phrase generating system, one or more synonyms for at least one of the tokens;
    generating, by the phrase generating system, a first answer to the first input phrase;
    generating, by the phrase generating system, one or more new phrases based on the one or more alternate grammar trees and the one or more synonyms, wherein the one or more new phrases are questions;
    receiving, by the phrase generating system, the one or more new phrases as input;
    generating, by the phrase generating system, one or more answers to the one or more new phrases; and
    determining, by the phrase generating system, using semantic analysis whether the one or more answers are similar to the first answer generated for the first input phrase to ensure that the phrase generating system provides a similar answer to a similar question and thereby improve operation of the phrase generating system.

2. The method of claim 1, further comprising:
    tagging, by the phrase generating system, the parts of speech prior to the generating the original grammar tree.

3. The method of claim 2, wherein the tagging further comprises:
    indicating whether the tokens correspond to one of a noun, a verb, an adjective, an adverb, and a pronoun.

4. A computer program product for a phrase generating system, the computer program product comprising:

a computer-readable storage device; and
computer-readable program code embodied on the computer-readable storage device, wherein the computer-readable program code, when executed by a phrase generating system, causes the phrase generating system to:
   receive a first input phrase for natural language expansion, wherein the first input phrase is a question;
   generate tokens that correspond to parts of speech for the first input phrase;
   generate an original grammar tree using at least some of the tokens;
   generate one or more alternate grammar trees that are different from the original grammar tree but equivalent to the original grammar tree;
   generate one or more synonyms for at least one of the tokens;
   generate a first answer to the first input phrase;
   generate one or more new phrases based on the one or more alternate grammar trees and the one or more synonyms, wherein the one or more new phrases are questions;
   receive the one or more new phrases as input;
   generate one or more answers to the one or more new phrases; and
   determine using semantic analysis whether the one or more answers are similar to the first answer generated for the first input phrase to ensure that the phrase generating system provides a similar answer to a similar question and thereby improve operation of the phrase generating system.

5. The computer program product of claim 4, wherein the computer-readable program code, when executed by the phrase generating system, further configures the phrase generating system to:
   tag the parts of speech prior to the generating the original grammar tree.

6. The computer program product of claim 5, wherein the computer-readable program code, when executed by the phrase generating system, further configures the phrase generating system to:
   indicate whether the tokens correspond to one of a noun, a verb, an adjective, an adverb, and a pronoun.

7. A phrase generating system, comprising:
a cache memory; and
a processor coupled to the cache memory, wherein the processor is configured to:
   receive a first input phrase for natural language expansion, wherein the first input phrase is a question;
   generate tokens that correspond to parts of speech for the first input phrase;
   generate an original grammar tree using at least some of the tokens;
   generate one or more alternate grammar trees that are different from the original grammar tree but equivalent to the original grammar tree;
   generate one or more synonyms for at least one of the tokens;
   generate a first answer to the first input phrase;
   generate one or more new phrases based on the one or more alternate grammar trees and the one or more synonyms, wherein the one or more new phrases are questions;
   receive the one or more new phrases as input;
   generate one or more answers to the one or more new phrases; and
   determine using semantic analysis whether the one or more answers are similar to the first answer generated for the first input phrase to ensure that the phrase generating system provides a similar answer to a similar question and thereby improve operation of the phrase generating system.

8. The phrase generating system of claim 7, wherein the processor is further configured to:
   tag the parts of speech prior to the generating the original grammar tree.

9. The phrase generating system of claim 8, wherein the processor is further configured to:
   indicate whether the tokens correspond to one of a noun, a verb, an adjective, an adverb, and a pronoun.

* * * * *